United States Patent
Oses et al.

(10) Patent No.: US 6,747,994 B2
(45) Date of Patent: Jun. 8, 2004

(54) SELECTING OPTIMAL TRANSMIT FORMATS FOR TRANSMISSIONS OVER ALLOCATED TIME DURATIONS

(75) Inventors: David Puig Oses, San Diego, CA (US); Yongbin Wei, San Diego, CA (US); Stein A. Lundby, Solana Beach, CA (US)

(73) Assignee: Qualcomm, Incorporated, San Deigo, CA (US)

( * ) Notice: Subject to any disclaimer, the term of this patent is extended or adjusted under 35 U.S.C. 154(b) by 191 days.

(21) Appl. No.: 09/981,846

(22) Filed: Oct. 17, 2001

(65) Prior Publication Data
US 2003/0072297 A1 Apr. 17, 2003

(51) Int. Cl.$^7$ .................................. H04J 3/16
(52) U.S. Cl. ........................ 370/468; 370/335
(58) Field of Search ................ 370/468, 328, 370/465, 466, 401, 335, 342

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 5,914,950 A * | 6/1999 | Tiedemann et al. ......... 370/348 |
| 6,094,428 A * | 7/2000 | Bruckert et al. ............ 370/335 |
| 6,122,291 A * | 9/2000 | Robinson et al. ........... 370/468 |
| 6,335,922 B1 * | 1/2002 | Tiedemann et al. ......... 370/335 |

FOREIGN PATENT DOCUMENTS

| | | |
|---|---|---|
| EP | 1134994 | 10/2000 |
| WO | 9733393 | 9/1997 |
| WO | 9945660 | 9/1999 |
| WO | 0025483 | 5/2000 |
| WO | 0154335 | 7/2001 |
| WO | 0171926 | 9/2001 |

OTHER PUBLICATIONS

Yuming Lu, et al., "Unified power control, error correction coding and scheduling for a CDMA downlink system;" Wireless Networks 3 (1997) 83–90.

* cited by examiner

*Primary Examiner*—Chi Pham
*Assistant Examiner*—Keith M. George
(74) *Attorney, Agent, or Firm*—Philip R. Wadsworth; Thien T. Nguyen; Kyong H. Macek (57) ABSTRACT

Methods and apparatus are presented to select optimal transmission formats for transmissions to a single user or simultaneous transmissions to multiple users. Priority information and channel state information associated with each user are used to determine the optimal transmit formats. In particular, said formation is used to maximize a given revenue function that enhances system throughput while maintaining fairness among users. Once transmit formats are determined, any unallocated system resources, such as unused Walsh codes or transmission power, can be evenly or proportionately distributed among the users.

15 Claims, 4 Drawing Sheets

SELECTING OPTIMAL TRANSMIT FORMATS FOR TRANSMISSIONS OVER ALLOCATED TIME DURATIONS

BACKGROUND

1. Field

The present invention relates generally to communications, and more specifically, to a system for selecting optimal transmission formats either for a single user or for simultaneous transmissions to multiple users.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communications systems that can be implemented. But problems exist amidst them all. Namely, multiple users must share limited system resources. In accordance with the actual system implementation, resources such as frequency bandwidth, time, transmission power, or spreading code assignments are typically shared by multiple users within the system. When allocating these system resources, the issues of fairness and efficiency must be considered by the service provider. In a FDMA system, the system bandwidth is divided into many frequency channels and each frequency channel is allocated to a user. In a TDMA system, the system bandwidth is divided into many time slots and each time slot is allocated to a user. In a CDMA system, the system bandwidth is simultaneously shared among all users by using spreading codes, wherein each user is assigned a spreading code.

In systems that can transmit data traffic in packetized formats, such as TDMA and CDMA systems, efficient scheduling of multiple users is a key aspect of system performance. In a typical TDMA system, only one user can be scheduled in a slot. A slot is a unit of time that carries a predetermined number of bits. The size of the slot can vary according to system design constraints. The scheduling of data for transmission in slots is typically based on whether data is designated for a user and whether the quality of the channel is within acceptable parameters. However, there are several reasons why this scheduling method is inadequate for optimized system performance.

One inefficiency problem with this scheduling method occurs whenever the amount of data designated for a user is smaller then the data transport capability of the system. If the quality of the channel is very high, then a large amount of data bits can potentially be transported in the assigned time duration. However, if the actual data that is to be transported is less than the potential data capacity, then the "fat pipe" is inefficient in terms of system throughput. It should be noted that system throughput is determined by the rate at which the original information bits is actually received, which differs from the rate of the transmitted bits within the slotted channel. Information bits are encoded, interleaved and modulated before transmission, so that the number of transmission bits that actually travels over the channel varies greatly from the original number of information bits.

Another inefficiency problem arises from quantization loss. In order to simplify the implementation of the communication system and to reduce the signaling overhead, various parameters are quantized with a limited number of quantization levels. For example, the number of payload bits that are transmitted in a packet, the modulation format and the frame duration are parameters that are typically rounded to allowed quantization levels. Due to the quantization nature of transmit formats, there is almost always a gap between the number of information bits that are actually transmitted in a slot and the number of bits that the system can support if there were no quantization. For example, if a system has data rates of 9.6 kbps and 192, kbps, then the system can transmit at only one of these two rates. Suppose a channel to a user can support 15 kbps. However, in order to ensure success, the system will assign a transmission rate of 9.6 kbps due to the quantization of data transmission rates. Hence, there is a 5.4 kbps loss.

The embodiments described herein address the above inefficiency problems by allowing the system to schedule multiple users within a transmission slot rather than just one user per slot, which is the case in a typical TDMA system. By utilizing CDMA techniques on a TDMA slot structure, multiple users will be scheduled to occupy the "fat pipe" to optimize system throughput. The embodiments will describe methods and apparatus for selecting transmit formats for each of the multiple users that are scheduled in a slot of a combined TDMA/CDMA system.

SUMMARY

Methods and apparatus are presented herein to address the above stated needs. In one aspect, a method is presented for transmitting data from a base station to at least one remote station, the method comprising: determining a priority for each of the at least one remote station; using the priority for each of the at least one remote station to determine at least one transmit format; formatting a data payload into a message frame in accordance with a selected transmit format, wherein the selected transmit format is selected from the at least one transmit frame; and transmitting the message frame to the remote station.

In another aspect, a method is presented for selecting transmit formats for a plurality of simultaneous transmissions from a base station, wherein each of the plurality of simultaneous transmissions is for a different remote station, comprising: determining a priority level for each remote station; using the priority levels for each remote station within a revenue function; and selecting a transmit format for each of the plurality of simultaneous transmissions based upon a value of the revenue function.

In another aspect, a method is presented for selecting a transmit format for a transmission to a remote station, comprising: selecting a plurality of possible transmit formats for the remote station; determining which of the plurality of possible transmit formats for the remote station uses the fewest Walsh codes; formatting the transmission to the remote station in accordance with the transmit format with the fewest Walsh codes; if more than one of the plurality of possible transmit formats uses the fewest Walsh codes, then determining which of plurality of possible transmit formats that uses the fewest Walsh codes further uses the least amount of transmission power; and formatting the transmission to the remote station in accordance with the transmit format with the fewest Walsh codes and the least amount of transmission power.

In another aspect, a method is presented for scheduling simultaneous transmissions to a plurality of remote stations to optimize system throughput, comprising: determining all supportable transmit format sets for a first remote station and the plurality of remote stations; determining all unused system resources in accordance with each of the supportable transmit format sets; evaluating a revenue function using each of the supportable transmit format sets; if only one transmit format set satisfies a criterion of the revenue function evaluation, then transmitting simultaneously to the first remote station and the plurality of remote stations in accordance with the transmit format set that satisfies a criterion of the revenue function evaluation; if multiple transmit format sets from the supportable transmit format sets satisfy a criterion of the revenue function evaluation, then selecting one of the multiple transmit format sets based upon the number of Walsh codes; and transmitting simultaneously to the first remote station and the plurality of remote stations in accordance with the selected transmit format set.

In other aspects, various apparatus are configured to execute the method aspects described above. For example, in one aspect, a memory element and a processor configured to execute a set of instructions stored within the memory element, the set of instructions for: selecting a plurality of possible transmit formats for the remote station; determining which of the plurality of possible transmit formats for the remote station uses the fewest Walsh codes; formatting the transmission to the remote station in accordance with the transmit format with the fewest Walsh codes; if more than one of the plurality of possible transmit formats uses the fewest Walsh codes, then determining which of plurality of possible transmit formats that uses the fewest Walsh codes further uses the least amount of transmission power; and formatting the transmission to the remote station in accordance with the transmit format with the fewest Walsh codes and the least amount of transmission power.

In another aspect, a memory element and a processor configured to execute another set of instructions stored within the memory element are presented, the set of instructions for: determining all supportable transmit format sets for a first remote station and the plurality of remote stations; determining all unused system resources in accordance with each of the supportable transmit format sets; evaluating a revenue function using each of the supportable transmit format sets; if only one transmit format set satisfies a criterion of the revenue function evaluation, then transmitting simultaneously to the first remote station and the plurality of remote stations in accordance with the transmit format set that satisfies a criterion of the revenue function evaluation; if multiple transmit format sets from the supportable transmit format sets satisfy a criterion of the revenue function evaluation, then selecting one of the multiple transmit format sets based upon the number of Walsh codes; and transmitting simultaneously to the first remote station and the plurality of remote stations in accordance with the selected transmit format set.

DETAILED DESCRIPTION

Figure 1:
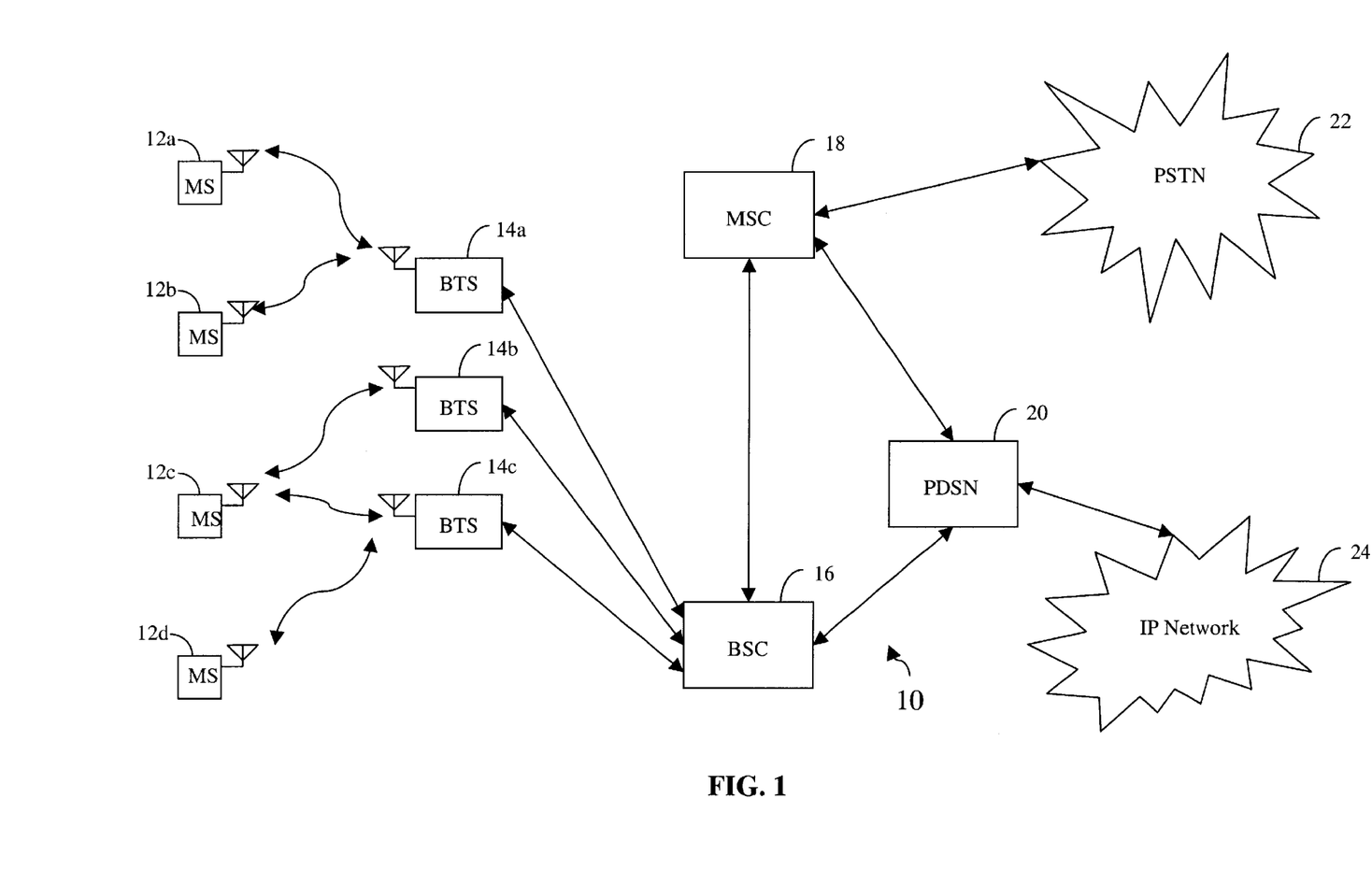
FIG. 1 is a diagram of a wireless communication network.

As illustrated in FIG. 1, a wireless communication network 10 generally includes a plurality of mobile stations (also called subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base station 14a–14c is processed within that base station 14a–14c. Each base station 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used herein. Such use is not intended to limit the implementation of the embodiments herein to cdma2000 systems. Embodiments can be implemented in other systems, such as, e.g., WCDMA, without affecting the scope of the embodiments described herein.

In a cdma2000 system, slot sizes have been designated as 1.25 ms in duration. In addition, data traffic can be transmitted in message frames, which can be different in durations, e.g., 1.25 ms, 2.5 ms, 5 ms, 10 ms, 20 ms, 40 ms, or 80 ms. The terms "slots" and "frames" are terms used with respect to different data channels within the same or between different CDMA systems. A CDMA system comprises a multitude of channels on the forward and reverse links, wherein some channels are structured differently from others. Hence, the terminology to describe some channels will differ in accordance with channel structure. For illustrative purposes only, the term "slots" will be used hereafter to describe the packaging of signals propagated over the air.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time-multiplexed manner. Alternatively, packet data channels are also described as shared supplemental channels. For the purposes of describing the embodiments herein, the supplemental channels and the packet data channels are generically referred to as data traffic channels.

Typically, when a scheduler unit or other infrastructure element within a base station receives transmission data for multiple remote stations, a system scheduling algorithm is implemented to decide the priority of the data to the various remote stations. The remote station with the highest priority is scheduled for transmission first in a system where remote stations are multiplexed in a TDMA manner. After the remote station with the highest priority is transmitted, the TDMA-type system will update the priorities of all remaining remote stations to determine which of the remaining then has the highest priority. Hence, the TDMA-type system only uses the highest priority index and disregards the rest. However, as discussed above, this scheduling method is not optimal due to the inefficiencies of transmitting data for only a single remote station over an entire slot.

The embodiments described herein are directed towards the implementation of an optimized scheduling algorithm, wherein multiple users can be scheduled for transmissions over an allocated time duration. In particular, the embodiments are directed towards a system that selects various transmit formats for data packets so that the simultaneous transmission of data for multiple users over a single slot can be accomplished.

In one embodiment, the priority information and the channel state information associated with each target remote station are used to determine the transmit format of data for each of the target remote stations. The priority information is usually determined by a scheduler unit or another infrastructure element within a base station.

In another embodiment, the determination of the transmit format of data for each of the target remote stations is based upon a selection of transmit formats that maximize a revenue function. Appropriate revenue functions are discussed below.

In another embodiment, the selection of the transmit format of data for each of the target remote stations is based upon maximizing a revenue function and is further based upon the available transmission power and available spreading codes.

Figure 2:
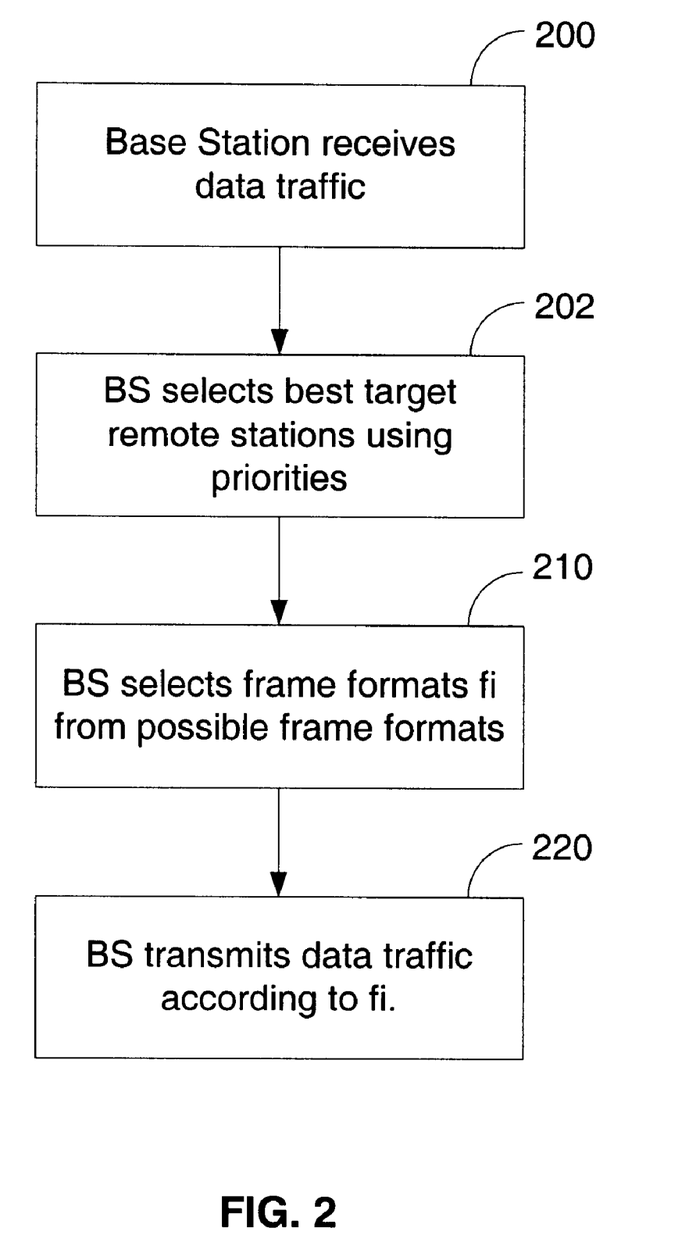
FIG. 2 is a flow chart describing a method for determining transmit formats of multiple, simultaneous transmissions to multiple remote stations.

FIG. 2 describes a procedure for selecting transmit formats for multiple, simultaneous transmissions from a base station to multiple remote stations during an allocated time duration. The selection procedure can be implemented by an additional processing element and memory element within a base station, or the selection procedure can be introduced into processing elements and memory elements that are already present within the base station. Various other infrastructure elements can also play a role in implementing the described method steps. At step 200, base station receives various data traffic messages for distribution to different remote stations operating within the range of the base station. At step 202, the scheduler unit or other infrastructure element within the base station selects the L best candidate remote stations for receiving transmissions. The L best candidate remote stations are referred to as $U_1, U_2, \ldots,$ and $U_L$. In deciding the L best candidate remote stations, the base station assigns priority indices $P_1, P_2, \ldots,$ and $P_L$ to $U_1, U_2, \ldots,$ and $U_L$, wherein $P_1 \geq P_2 \geq \ldots \geq P_L$. Each candidate remote station $U_1, U_2, \ldots,$ and $U_L$ is the intended recipient of a data payload $N_1, N_2, \ldots,$ and $N_L$, respectively, where the payloads can be determined based upon the amount of information bits to be transmitted to each remote station.

It should be noted that some communication systems have the capability of collecting channel state information, such as carrier-to-interference ratio (C/I), from the remote stations. The remote stations use a priori information of the pilot channel to determine the characteristics of the transmission media. The embodiments described herein can use such channel state information C/I to select the optimal transmit format for each remote station. Let $(C/I)_1, (C/I)_2, \ldots,$ and $(C/I)_L$ be the channel station information reported by all candidate remote stations.

Predetermined transmit formats $F_0, F_1, F_2, \ldots,$ and $F_{M-1}$ are stored within the base station, wherein each transmit format $F_i$ corresponds to a combination of various transmit parameters. In one embodiment, the transmit format $F_i$ corresponds to a combination of any or all of the following transmit parameters: the modulation scheme used by the system, the number of orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps.

Orthogonal and quasi-orthogonal codes, such as the Walsh codes, are used to channelize the information sent to each remote station. In other words, Walsh codes are used on the forward link to allow the system to overlay multiple users, each assigned a different orthogonal or quasi-orthogonal code, on the same frequency during the same time duration.

Hence, the base station has a choice of transmitting a data payload in accordance with a variety of transmit formats. For purposes of illustration, a data payload that has been configured by the base station in accordance with a transmit format will be referred to as a frame. For this embodiment, the term $F_0$ corresponds with the instance where there are no transmissions to a remote station.

Once the base station determines the L best candidates and their associated priorities, then at step 210, the base station selects a frame format $f_i$ for each $U_i$ so that the group of frame formats $f_1, f_2, \ldots,$ and $f_L$ maximizes a revenue function J( ). Examples of possible revenue functions will be discussed in more detail below.

In one embodiment, the base station performs the selection by choosing a subset $(f_{1-test}, f_{2-test}, \ldots,$ and $f_{L-test})$ of the possible frame formats from the set $(F_0, F_2, \ldots, F_{M-1})$, and then determines whether certain conditions are satisfied. In one embodiment, four conditions are used as follows:

$$\sum_{i=1}^{L} \text{Nb\_Walsh}(f_i) \leq \text{Total\_Available\_Walsh\_Codes\_for\_Packet\_Data}, \quad 1$$

wherein $\text{Nb\_Walsh}(F_i)$ is the number of Walsh codes used in transmit format $F_i$ and $\text{Nb\_Walsh}(F_0)=0$. The quantity "Total Available Walsh Codes for Packet Data" is a parameter that can be determined at the base station during the course of operations.

$$\sum_{i=1}^{L} E_i(f_i) \leq \text{Total\_Available\_Power\_for\_Packet\_Data}, \quad 2$$

wherein $E_i(F_k)$ is the minimum power required for transmission to $U_i$ using transmit format $F_k$. The quantity "Total Available Power for Packet Data" is a parameter that can be determined at the base station during the course of operations. It should be noted that this parameter is a function of the C/I of the remote station $U_i$, as well as the transmit format $F_k$.

$$\text{Payload}(f_i) \leq N_i \text{ for any } i \in \{1, 2, \ldots, L\}, \quad 3$$

wherein $\text{Payload}(F_i)$ is the data payload of $F_i$ in bits.

$$\text{FrameDuration}(f_i)=\text{FrameDuration}(f_j) \text{ for any } i, j \in \{1, 2, \ldots, L\}, \text{ and } f_i \neq F_0, f_j \neq F_0, \quad 4$$

wherein $\text{FrameDuration}(F_i)$ is the frame duration specified in transmit format $F_i$. Note that less than L users are scheduled if $f_i = F_0$ for any $i \in \{1, 2, \ldots, L\}$.

Once the base station selects the group of frame formats $f_1, f_2, \ldots,$ and $f_L$ that maximizes a revenue function J( ), then at step 220, the base station simultaneously transmits message frames to the L users using the L frame formats $f_1, f_2, \ldots,$ and $f_L$ over the allocated time duration.

Examples of Revenue Function J( )

The above embodiments for selecting a transmit format are based upon the use of priority information applied to a revenue function. A revenue function can be any function that maximizes the data throughput while ensuring a designated degree of fairness. "Fairness" is a subjective quantity that is dependent upon the requirements of a system provider. For example, a system provider may decide that it is unacceptable for a single user to monopolize resources for a large data transfer over a long period of time. However, the system provider may decide that it is acceptable for a single user to monopolize resources for a short period of time. Fairness could also be dictated by arrival time of data payloads, or by the origination point of the data payload, or by the quantity of the data payload. Fairness could also be dictated by the quality of the service, or by the price of the communication access. These examples illustrate that "fairness" is a system constraint that can be defined in very different ways. However, the quantity of "fairness" can be factored into consideration by the appropriate revenue function.

In one embodiment, the following revenue function J( ) can be used:

$$J(f_1, f_2, \ldots, f_L) = \text{Payload}(f_1) \cdot P_1^{\alpha} \text{Payload}(f_2) \cdot P_2^{\alpha} + \ldots + \text{Payload}(f_L) \cdot P_L^{\alpha},$$

wherein $\alpha \geq 0$ is a constant that controls fairness.

Using the above revenue function, a message frame will tend to be scheduled if the data payload comprises a large number of bits or if the priority index is high.

In another embodiment, the following revenue function J( ) can be used:

$$J(f_1, f_2, \ldots, f_L) = \begin{cases} 0 & \text{if } f_1 = F_0 \\ \text{Payload}(f_1) \cdot P_1^\alpha + \text{Payload}(f_2) \cdot P_2^\alpha + \ldots + \text{Payload}(f_L) \cdot P_L^\alpha & \text{otherwise} \end{cases}$$

wherein $\alpha \geq 0$ is a constant that controls fairness.

Using the above revenue function, the remote station with the highest priority $P_1$ will always be scheduled to guarantee fairness.

The transmit format selection process described in FIG. 2 describes how one may choose the transmit formats that maximize the given revenue function. Other embodiments exist. Another embodiment on how to choose the best multiple formats $f_1, f_2, \ldots,$ and $f_L$ is presented herein when multiple users are actually scheduled. Yet another embodiment is described herein on how to choose the best transmit format if only one user is actually scheduled (excluding $F_0$). These choices can be further analyzed to determine how many and which users should be scheduled to maximize the revenue function J( ), and the corresponding transmit formats.

Figure 3:
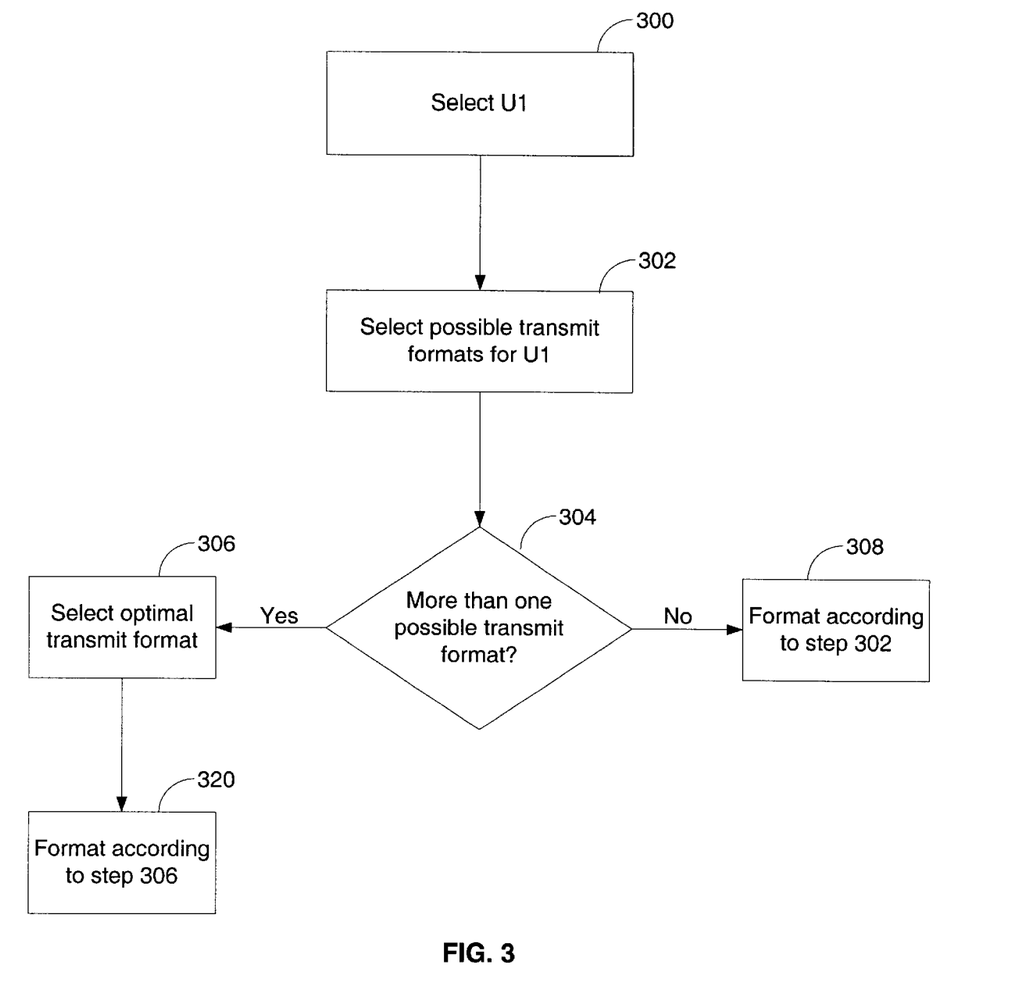
FIG. 3 is a flow chart illustrating a selection of an optimal transmit format from possible transmit formats for one remote station.

FIG. 3 describes an embodiment on how to choose the best transmit format if only one user is scheduled. It comprises a selection criterion for the instance wherein only one remote station is scheduled, but multiple transmit formats exist that satisfy the same revenue function.

At step 300, the base station selects a primary target $U_1$, based upon a priority index or the information bits in the buffer. At step 302, the base station selects at least one possible transmit format for the data traffic payload to $U_1$. In one embodiment, the selection of the plurality of possible transmit formats is based upon a revenue function that maximizes system throughput. At step 304, if there are more than one possible transmit format, the program flow proceeds to step 306. There will be more than one possible transmit format if there are multiple transmit formats that maximize the revenue function J( ). If only one possible transmit format is possible, then the program flow proceeds to step 308, wherein the base station formats the data traffic payload in accordance with the selected transmit format.

At step 306, the base station selects the optimal transmit format based upon the transmit format that requires the fewest Walsh codes. At step 320, the base station formats the data traffic payload in accordance with the selected optimal transmit format.

Figure 4:
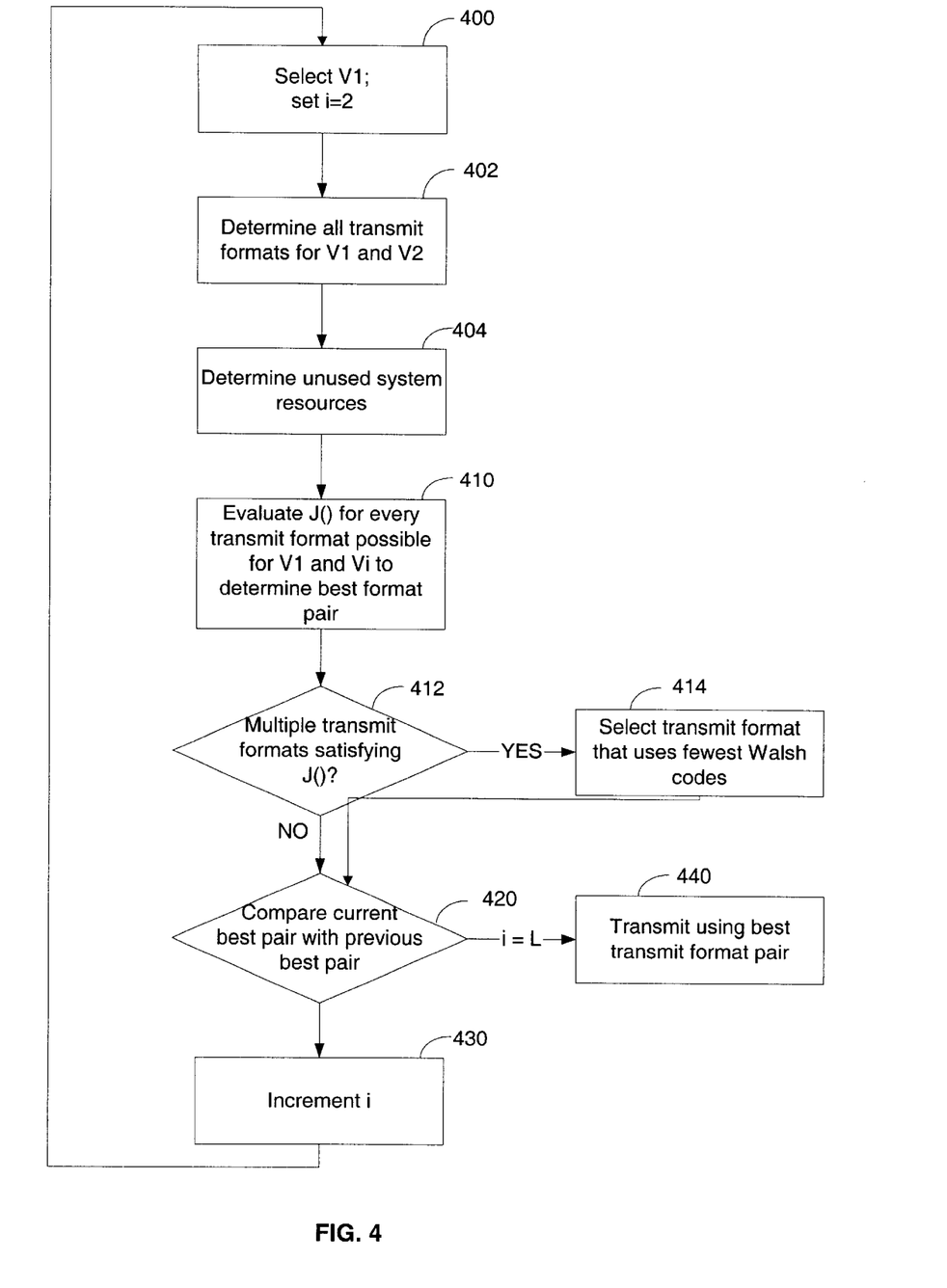
FIG. 4 is a flow chart illustrating a selection of optimal transmit formats for at least two remote stations.

FIG. 4 describes another embodiment for a selection criterion when multiple remote stations need to be scheduled for transmission. Let the candidates for target remote stations be denoted $V_1, V_2, \ldots,$ and $V_L$, wherein each $V_i$ is associated with a priority index $P_i$, such that $P_1 \geq P_2 \geq \ldots \geq P_L$.

At step 400, the base station designates $V_1$ as the highest priority target remote station and sets an index i=2 for variable $V_i$.

At step 402, the base station determines all transmit formats for $V_1$ and $V_i$ that can be supported by the system. The set of good transmit format pairs is denoted $\{(f_j, f_k): 1 \leq j, k \leq L,$ such that $j \neq k$ and L is the maximum number of remote stations that can be scheduled simultaneously$\}$. In one embodiment, the base station evaluates frame duration, number of Walsh codes, and/or the required minimum transmit power associated with each of the transmit formats in order to determine whether the system can support the transmit formats.

At step 404, the base station determines the amount of system resources, such as Walsh codes and transmission power, that is left unused for each transmit format pair $(f_j, f_k)$ determined at step 402.

At step 410, the base station evaluates a given revenue function J( ) for each transmit format pair. The transmit format pair that maximizes the revenue function J( ) is chosen as the best pair. At step 412, a determination is made as to whether there are multiple transmit format pairs that maximize the revenue function. If there are more than one pair of transmit formats that maximize the revenue function, then at step 414, the base station chooses the transmit format pair that requires the fewest Walsh codes. The program flow then proceeds to step 420. If there is only one pair of transmit formats that maximize the revenue function, then the program flow also proceeds to step 420.

At step 420, the base station determines whether the best transmit format pair for $V_1$ and $V_i$ is better than a previous best transmit format pair. In other words, the base station compares the best transmit format pair determined during this round to the best transmit format pair determined from a previous round. The best transmit format pair from this comparison determines the best candidate remote station to be scheduled along with $V_1$.

At step 430, the index i is incremented and above steps are repeated until all candidates are exhausted. When i reaches the last increment value, then at step 440, the base station schedules simultaneous transmissions to $V_1$ and $V_{best}$ in accordance with the determined best transmit format.

Alternatively, the above process can be rewritten using multiple loops, wherein an outer loop scans each $V_i$, a middle loop scans each possible transmit format for $V_1$, and an inner loop scans the candidates for the second user using the remaining Walsh codes and left-over power. As is known to one of skill in the art, the programming implementation can vary without affecting the scope of the embodiments herein.

The above embodiments describe a search for the best transmit formats for simultaneous transmissions to two remote stations. However, the above embodiment can be extended to describe a search for the best transmit formats to more than two remote stations. Rather than searching for all the transmit formats for only $V_1$ and $V_j$, the base station can search for all transmit formats for $V_1$ through to $V_m$, wherein m is the number of simultaneous transmissions to m multiple stations. Hence, rather than evaluating the transmit format pairs, the system would evaluate the transmit format sets to maximize a given revenue function.

In another embodiment, a further step can be added to the system taught herein in order to more fully utilize system resources. After the base station selects the optimal transmit formats for the simultaneous multiple transmissions, the base station determines whether any Walsh codes and power are left unused. If there are unused Walsh codes and power, then they are allocated among the remote stations that are to be scheduled. The allocation can be done evenly or based upon the remote stations' priority indices and/or the minimum power requirements. In one embodiment, the left-over Walsh codes are allocated based upon the priority indices of the remote stations. In another embodiment, the left-over power is allocated proportionally in accordance with the minimum power requirement.

As discussed previously, Walsh codes or other orthogonal/ quasi-orthogonal codes are important to provide channelization of transmissions to individual remote stations. An important aspect of the use of Walsh codes is the relationship between the number of Walsh codes used to cover data bits and transmission power levels. A simplistic explanation is that when more Walsh codes are used to spread the original data bits, error control coding rates becomes lower and the transmit power efficiency is improved.

Accordingly, another further step that can be added to the embodiments described above is the step of determining whether any transmission power is left unallocated at the base station. If there is any remaining transmission power, then the base station can proportionally allocate the power among the data traffic payloads, in accordance with the $E_t(f_k)$ for each remote station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data from a base station to at least one remote station, comprising:

determining a priority for each of the at least one remote station;

determining that a plurality of possible transport formats are supported by the base station;

determining whether the number of Walsh codes used by the plurality of possible transport formats are less than a first predetermined amount;

determining whether the total minimum power required for transmission is less than a second predetermined amount;

determining whether the data payload of each of the plurality of possible transport formats is less than an allocated amount;

determining whether the frame durations of each of the plurality of possible transport formats are equal; and if the number of Walsh codes are less than the first predetermined amount, and the total minimum power required for transmission is less than the second predetermined amount, and the data payload of each of the plurality of possible transport formats is less than the allocated amount, and the frame durations of each of the plurality of possible transport formats are equal, then designating that the plurality of possible transport formats are supported by the base station;

using the priority for each of the at least one remote station to determine at least one transmit format;

formatting a data payload into a message frame in accordance with a selected transmit format, wherein the selected transmit format is selected from the at least one transmit format; and transmitting the message frame to the at least one remote station.

2. The method of claim 1, wherein using the priority for each of the at least one remote station to determine at least one transmit format comprises:

extracting a plurality of transmit parameters from the plurality of possible transport formats;

inserting the plurality of transmit parameters and the priority information into a revenue function; and maximizing the revenue function, wherein the determination of the at least one transmit format is based upon the plurality of transmit parameters that maximize the revenue function.

3. The method of claim 1, wherein the selected transmit format is selected from the at least one transmit frame by choosing a transmit format that uses the fewest Walsh codes.

4. The method of claim 1, wherein formatting the data payload into a message frame in accordance with a selected transmit format further comprises allocating unused Walsh codes to the selected transmit format.

5. The method of claim 1, wherein transmitting the message frame to the remote station further comprises using an allocated minimum transmission power, which is based upon the selected transmit format and a remaining transmission power level.

6. A method for selecting transmit formats for a plurality of simultaneous transmissions from a base station, wherein each of the plurality of simultaneous transmissions is for a different remote station, comprising:

determining a priority level for each remote station;

using the priority levels for each remote station within a revenue function, wherein the revenue function is defined by the equation:

$$J(f_1, f_2, \ldots, f_L) = \text{Payload}(f_1) \cdot P_1^\alpha + \text{Payload}(f_2) \cdot P_2^\alpha + \ldots + \text{Payload}(f_L) \cdot P_L^\alpha,$$

wherein $\alpha \geq 0$ is a constant that controls fairness, wherein fairness is a subjective quantity determined by a system provider; and selecting a transmit format for each of the plurality of simultaneous transmissions based upon a value of the revenue function.

7. The method of claim 6, wherein selecting the transmit format for each of the plurality of simultaneous transmissions comprises:

determining whether more than one transmit format can maximize the value of the revenue function for one transmission from the plurality of simultaneous transmissions;

if more than one transmit format maximizes the value of the revenue function, then selecting the transmit format that uses the least number of Walsh codes; and if only one transmit format maximizes the value of the revenue function, then selecting the one transmit format.

8. A method for selecting transmit formats for a plurality of simultaneous transmissions from a base station, wherein each of the plurality of simultaneous transmissions is for a different remote station, comprising:

determining a priority level for each remote station;

using the priority levels for each remote station within a revenue function, wherein the revenue function is defined by the equation;

$$J(f_1, f_2, \ldots, f_L) = \begin{cases} 0 & \text{if } f_1 = F_0 \\ \text{Payload}(f_1) \cdot P_1^\alpha + \text{Payload}(f_2) \cdot P_2^\alpha + \ldots + \text{Payload}(f_L) \cdot P_L^\alpha & \text{otherwise} \end{cases}$$

wherein $\alpha \geq 0$ is a constant that controls fairness, wherein fairness is a subjective quantity determined by a system provider; and selecting a transmit format for each of the plurality of simultaneous transmissions based upon a value of the revenue function.

9. An apparatus for transmitting data from a base station to at least one remote station, comprising:

a memory element; and a processor configured to execute a set of instructions stored within the memory element, the set of instructions for:

determining a priority for each of the at least one remote station;

determining that a plurality of possible transport formats are supported by the base station;

determining whether the number of Walsh codes used by the plurality of possible transport formats are less than a first predetermined amount;

determining whether the total minimum power required for transmission is less than a second predetermined amount;

determining whether the data payload of each of the plurality of possible transport formats is less than an allocated amount; and determining whether the frame durations of each of the plurality of possible transport formats are equal:

using the priority for each of the at least one remote station to determine at least one transmit format;

formatting a data payload into a message frame in accordance with a selected transmit format, wherein the selected transmit format is selected from the at least one transmit frame; and transmitting the message frame to the remote station.

10. The apparatus of claim 9, wherein the processor is further configured to execute additional instructions for using the priority for each of the at least one remote station to determine at least one transmit format, the additional instructions for:

extracting a plurality of transmit parameters from the plurality of possible transport formats;

inserting the plurality of transmit parameters and the priority information into a revenue function; and maximizing the revenue function, wherein the determination of the at least one transmit format is based upon the plurality of transmit parameters that maximize the revenue function.

11. The apparatus of claim 9, wherein the processor is further configured to execute instructions for choosing the selected transmit format from the at least one transmit frame by choosing a transmit format that uses the fewest Walsh codes.

12. The apparatus of claim 9, wherein the processor is further configured to execute instructions for allocating unused Walsh codes to the selected transmit format.

13. The apparatus of claim 9, wherein the processor is further configured to execute instructions for transmitting the message frame with an additional allocated minimum transmission power, which is based upon the selected transmit format and a remaining transmission power level.

14. An apparatus for determining the optimal transmit format for data transmitted from a base station to at least one remote station, comprising:

means for determining a priority for each of the at least one remote station;

means for determining that a plurality of possible transport formats are supported by the base station;

means for determining whether the number of Walsh codes used by the plurality of possible transport formats are less than a first predetermined amount;

means for determining whether the total minimum power required for transmission is less than a second predetermined amount;

means for determining whether the data payload of each of the plurality of possible transport formats is less than an allocated amount; and means for determining whether the frame durations of each of the plurality of possible transport formats are equal;

means for using the priority for each of the at least one remote station to determine at least one transmit format; and means for formatting a data payload into a message frame in accordance with a selected transmit format, wherein the selected transmit format is selected from the at least one transmit format.

15. The apparatus of claim 14, wherein the means for using the priority for each of the at least one remote station is further for:

extracting a plurality of transmit parameters from the plurality of possible transport formats;

inserting the plurality of transmit parameters and the priority information into a revenue function; and maximizing the revenue function, wherein the determination of the at least one transmit format is based upon the plurality of transmit parameters that maximize the revenue function.

* * * * *